Sept. 15, 1959 J. A. McBRIDE ET AL 2,904,412
CRYSTAL SEPARATION AND PURIFICATION
Filed Dec. 28, 1953
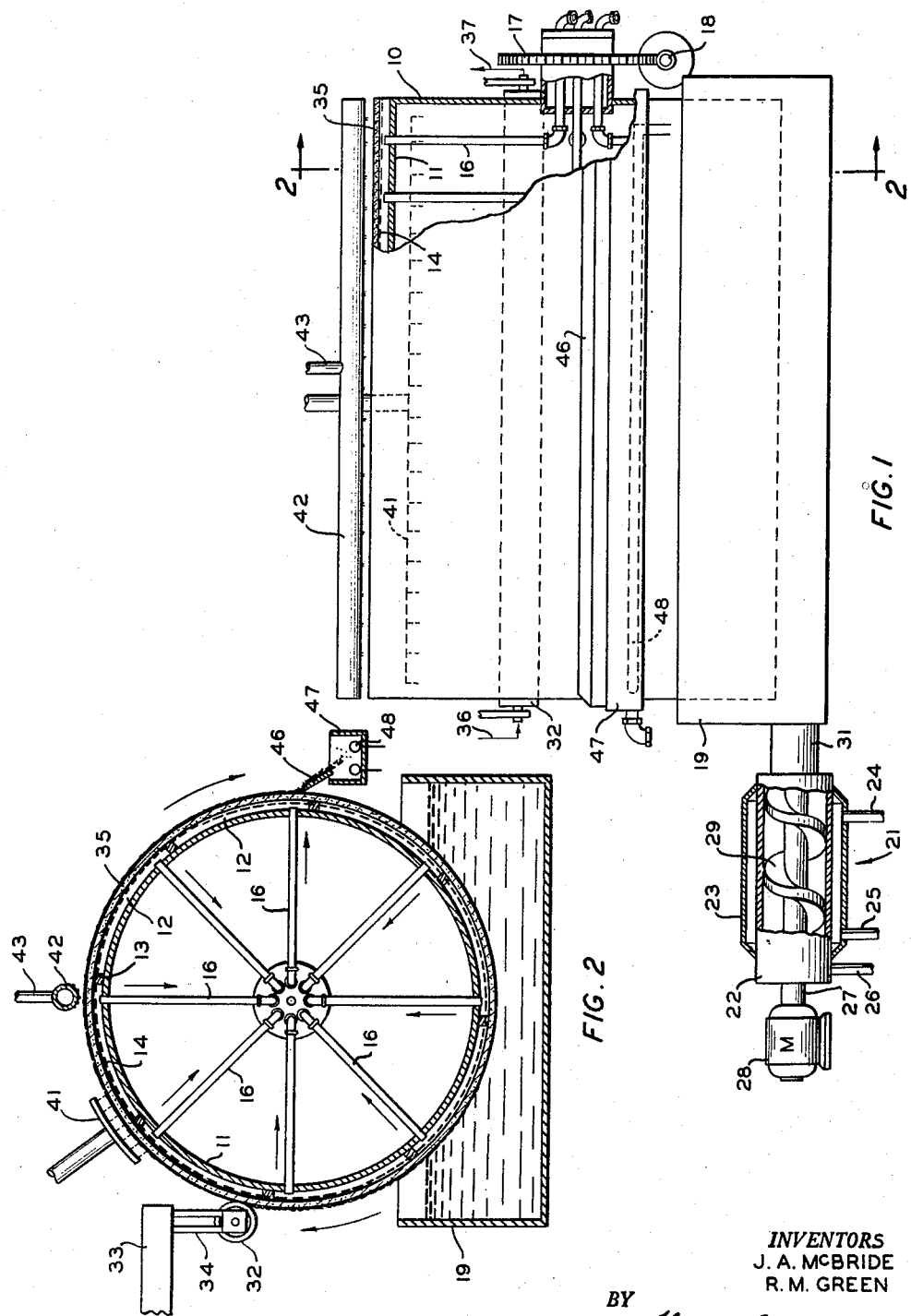
INVENTORS
J. A. McBRIDE
R. M. GREEN
BY
*Hudson and Young*
ATTORNEYS

United States Patent Office 2,904,412
Patented Sept. 15, 1959

2,904,412

CRYSTAL SEPARATION AND PURIFICATION

John A. McBride, Waco, and Richard M. Green, Borger, Tex., assignors to Phillips Petroleum Company, a corporation of Delaware Application December 28, 1953, Serial No. 400,659

2 Claims. (Cl. 23—302)

This invention relates to separation of components of liquid multi-component mixtures. In one of its more specific aspects, it relates to the separation of components of liquid multi-component mixtures according to their freezing points in those mixtures. In another of its more specific aspects, it relates to a process for crystal separation and purification from liquid mixtures. In still another of its more specific aspects, it relates to apparatus for crystal separation and purification from liquid mixtures.

In the separation of components of liquid multi-component mixtures by crystallization methods, it is theoretically possible in many cases to obtain at least one of the components in substantially pure form in a single stage of operation. Accordingly, while distillation and solvent extraction methods of separation in theory would require infinite stages for a pure product, only one stage of crystallization should be required since crystals separating from a solution are presumed to have a definite composition. In actual practice, however, it has been found that the crystals obtained from a solution of several components are impure because of the occlusion of mother liquor within the crystal interstices.

The amount of mother liquor occluded or entrapped by the crystals formed is ordinarily so great that it is necessary to provide some method for the removal of the occluded impurities if a high purity product is to be obtained in a single crystallization stage. In accordance with the present invention, a process and apparatus is provided whereby it is possible to remove substantially all of the occluded impurities from the crystals so that it is possible to obtain at least one of the components of the starting mixture in substantially pure form.

The objects of this invention will be attained by the various aspects of the invention.

It is an object of the present invention to provide an improved process for the separation and purification of a component of a liquid multi-component mixture.

Another object of the invention is to provide a crystal separation process wherein substantially all of the occluded impurities are removed from the crystals so as to obtain a high purity product.

Still another object of the invention is to provide a process for the separation and purification of a component from a multi-component organic mixture.

A further object of the invention is to provide an improved apparatus for crystal separation from liquid mixtures.

Still other objects and advantages will become apparent to those skilled in the art from the following description and disclosure.

Broadly speaking, the present invention is directed to a process for separating a component from a liquid multi-component mixture wherein a filtering means is coated with a layer of crystals formed by the component upon cooling the mixture. A portion of one of the surfaces of the layer of crystals is melted by applying heat thereto in the form of a stream of warm air, infra-red radiation or other suitable heating means. A suction is applied to the layer of crystals so as to draw the resulting melt as reflux through the crystals and in intimate contact therewith so as to remove occluded or entrapped impurities. The washed layer of crystals is thereafter recovered as substantially pure product.

A more complete understanding of the invention may be obtained by reference to the following description and the accompanying drawing, in which:

Figure 1 is a diagrammatic elevation, partly in section, of an arrangement of apparatus suitable for practicing the process of this invention; and Figure 2 is a cross-sectional view taken along line 2—2 of Figure 1.

Referring to Figures 1 and 2 of the drawing, there is illustrated a rotary filter comprising a substantially horizontal cylindrical drum 10. The exterior surface 11 of the drum is divided into a number of longitudinal segments by means of raised strips 13 placed parallel to the axis of the drum. Supports in the form of wooden or metal strips positioned around the surface of the drum at spaced intervals between dividing strips 13 may be provided in order to lend added support to filter medium 14. Filter medium 14, which may be either cloth or wire screening, is wrapped around the drum, covering its outer surface and dividing strips 13, and is held in place by means of a wrapping of wire or metal bands. At least one suction pipe 16 communicates with each of the spaces 12 defined by drum surface 11, strips 13 and filter medium 14, each pipe being connected to a means, not shown, for creating a vacuum beneath the filter medium. Cylindrical drum 10 is rotated by means of gears 17 and 18 which are operatively connected to a motor, not shown. The drum turns in tank 19, being partly submerged in a slurry supplied to the tank by chiller 21. For the description of a rotary vacuum filter which can be adapted to perform the process of this invention, reference may be made to "Elements of Chemical Engineering," Badger and McCabe, pages 484–487.

The chiller comprises tubular member 22 provided with a refrigeration means such as an annular jacket 23 which is equipped with refrigerant inlet line 24 and refrigerant outlet line 25 by means of which a refrigerant is introduced into and withdrawn from the annular space between tubular member 22 and jacket 23. Liquid inlet line 26 is connected to tubular member 22 for introduction of feed material into the chiller. Shaft 27, connected to motor 28, is centrally disposed within tubular member 23 and has attached thereto an auger or helix 29. The delivery end of the chiller is connected to tank 19 by means of conduit 31.

Chilled roller 32 is suspended from beam 33 by means of frame 34 in a position adjacent to the rotary drum so that the roller will compress filter cake 35 formed on the filter medium. Inlet line 36 and outlet line 37 are connected to either end of a passage extending through the roller and provide means for circulating a coolant therethrough. Nozzle 41 is positioned above drum 10 in the direction of rotation of the drum from roller 32 for spraying a wash liquid upon the filter cake. A heating means is also disposed above the filter drum in the direction of rotation of the drum from nozzle 41 to provide means for melting the surface crystals of the filter cake. As illustrated, the heating means is a perforated pipe 42 connected by line 43 to a source of warm air. It is to be understood that other heating means, such as a source of infra-red radiation, can be utilized.

At least one doctor blade 46 is positioned next to the rotary drum to provide means for removing the filter cake from the drum. The crystals upon removal fall into a container 47 provided with electrical heating element 48 for melting the crystals. Other means can of course be provided for accomplishing this melting, e.g., the feed material before being charged to the chiller can be passed as a heat transfer fluid through a coil submerged in container 47. It is also within the scope of the invention to supply a compressed gas such as air at the crystal discharge point in order to loosen the filter cake and thereby assist the blade in removing crystals from the filter drum. To this end, an automatic valve may be provided which cuts off the suction to the appropriate suction pipe 16 as it approaches the discharge point and supplies compressed air thereto.

In the practice of the process of this invention utilizing the apparatus of Figures 1 and 2, a liquid feed mixture, which may be a liquid multi-component mixture containing components of different melting points, is introduced through line 26 into chiller 21. Refrigerant is passed into the annular space between tubular member 22 and annular jacket 23 at a rate sufficient to maintain chiller 21 at a temperature low enough to crystallize one of the components of the feed mixture. Shaft 27 is slowly rotated by motor 28 causing auger 29 to remove any crystals formed on the walls of tubular member 22. The rotation of auger 29 also aids in moving the slurry of crystals of the high melting component and mother liquor through conduit 31 into tank 19.

Rotary drum 10 rotates in container 19 partly submerged in the slurry contained therein. The crystalline material contained in the slurry is picked up on filter medium 14 of the rotating drum by the vacuum exerted by suction pipes 16 on the underside of the filter medium. The filter cake, composed of crystals of the high melting component of the feed mixture together with residual mother liquor, leaves the crystal slurry in tank 19 and contacts chilled roller 32. As the filter cake passes under the roller it is compressed, thereby partially drying the cake by squeezing out excess mother liquor. The compression of the filter cake also serves to increase the density of the cake thereby improving the washing action of the wash liquid to be applied to the filter cake in subsequent steps. Roller 32 is chilled by passing a coolant into the interior passage of the roller through line 36 and withdrawing same through line 37. The temperature of the roller is controlled so that it is maintained at a temperature higher than that of the filter cake in order to prevent adherence of the crystals to the roller, but it is important that the temperature not be high enough to promote excessive melting of the filter cake. During the compression of the filter cake, it is being subjected to a vacuum which aids in removing mother liquor from the filter cake through suction pipes 16. The mother liquor, or any proportion thereof, can thereafter, if desired, be recycled to the chiller.

Following the compression step, the filter cake passes under nozzle 41 which sprays a suitable wash liquid over the filter cake. Wash liquids which can be used to wash the mother liquor from the surface of the crystals include liquid hydrocarbons and aqueous salt solutions. The wash liquid is maintained at a temperature only very slightly above that of the crystals in order to prevent excessive melting of the filter cake. Through the operation of the vacuum being exerted on the underside of the filter medium by suction pipes 16, the wash liquid is drawn through the filter cake effectively removing mother liquor from the surface of the crystals.

After being subjected to washing by the wash liquid and thereafter allowed to suck dry, the filter cake moves under the heating means where a controlled quantity of crystals on the outer surface of the filter cake is melted by passing streams of warm air onto the cake through perforations in pipe 42. It is also within the scope of the invention to melt the surface of the filter cake by exposing same to a source of infra-red radiation or other suitable heating means. The relatively pure melt resulting from the melting of the high melting component crystals is drawn through the filter cake as reflux through the operation of the vacuum exerted by suction pipes 16. In passing through the filter cake, the substantially pure melt washes or displaces substantially all of the occluded or entrapped impurities from the crystals. The amount of heat applied to the surface of the filter cake to provide the reflux liquid must be carefully controlled in order to furnish sufficient liquid to perform the desired washing action. At the same time, however, the amount of crystalline material melted must not be excessive, or otherwise the product yield will be correspondingly low. The liquid reflux, or any desired proportion thereof, can thereafter, if desired, be recycled to the chiller.

In a modification of the present invention, the heating means is omitted from the apparatus, and the necessary heating of the surface crystals is provided by controlling the temperature of the wash liquid furnished by nozzle 41. Accordingly, an aqueous wash liquid is sprayed over the surface of the filter cake at a temperature high enough to cause melting of the desired proportion of the crystals. Alternatively, two separate wash solutions may be supplied through separate nozzles, the first at a low temperature in order to wash the mother liquor from the surface of the crystals and the second at a higher temperature to be furnished immediately thereafter in order to melt a suitable proportion of the crystals and thereby supply the reflux liquid. When utilizing two separate wash solutions, nozzle 41 supplies the first wash liquid to the filter cake while a second similar nozzle replaces the heating means, thereby providing means for spraying the second wash liquid onto the filter cake.

After the reflux liquid has been removed from the filter cake by the vacuum exerted on the underside of the filter medium, the filter cake is contacted by doctor blade 46. The crystals are scraped from the filter cake by blade 46 and fall into container 47 where they are melted by the heat supplied by electrical heating element 48. The crystals in container 47 can be melted by various other means, such as by placing a coil in a container through which a heat transfer medium is circulated. It is within the scope of the present invention to utilize the fresh feed material as the heat transfer medium prior to its introduction into chiller 21. Thereafter, the liquid material is removed from container 47 as high purity product and passed to suitable storage facilities.

The high purity of product obtainable by the process of this invention is due primarily to the washing action of the crystal melt as it is drawn through the filter cake in intimate contact with the crystals. Since the melt results from melting crystals of the high melting component, it is itself comparatively pure and when passed through the crystals acts to effectively displace the impurities occluded in the crystal interstices. The steps in the process whereby the filter cake is compressed and subjected to the washing action of a wash liquid are effective in removing a part of the mother liquor from the filter cake, but it is the reflux step which makes possible the high purity of product obtainable by the process of this invention. Accordingly, by compressing the filter cake, the excess of mother liquor is squeezed out and the density of the cake is increased so as to improve the washing action performed in subsequent steps. By washing the filter cake with a wash liquid, mother liquor is removed from the surface of the crystals. It is apparent, therefore, that it is the washing action of a comparatively pure melt which finally forces the last traces of occluded impurities from the crystals and that the prior steps are merely preliminary to the final reflux step.

Multi-component mixtures suitable as feed stocks in the process of this invention include those which form at least one simple, binary eutectic. The process is applicable to the separation and purification of mixtures of two or more components provided the composition is such that one pure compound will crystallize out first as the mixture is cooled. The invention is particularly applicable to the separation of hydrocarbons which have practically the same boiling points, and are, therefore, difficult to separate by distillation. Where high boiling organic compounds are concerned, separation by distillation is often undesirable because many such compounds are unstable at high temperatures. As specific examples of organic systems to which this invention is applicable, there may be mentioned the separation of systems containing xylenes, systems containing cyclohexane, systems containing normal paraffins, systems containing benzene, and the like. Thus, it has been fond that paraxylene can be separated from a multi-component mixture comprising isomeric alkyl benzenes, that benzene can be separated from a mixture comprising a paraffinic hydrocarbon and benzene, and that cyclohexane can be separated from a mixture comprising a paraffinic hydrocarbon and cyclohexane.

It is not intended, however, to limit the invention to organic mixtures, but rather it is applicable to inorganic mixtures as well and offers a practical method of separating two inorganic components between which solvates and hydrates are formed. Examples of inorganic systems to which this invention is applicable are those for the recovery of pure salts, such as ammonium nitrate, and of anhydrous salts from their hydrates.

The following illustrative example, which is not intended to be unduly limitative of the invention, will provide a more comprehensive understanding of the invention.

In this example, a mixture comprising meta, para and ortho xylenes, with ethylbenzene and paraffinic impurities, obtained by fractionally distilling a commercial xylene concentrate and separating the fraction rich in meta- and paraxylene, is passed into a chiller and cooled therein to a temperature between about −70 to −90° F. A slurry of paraxylene crystals and mother liquor is passed from the chiller to the reservoir of a continuous rotary filter. The filter cake is compressed and thereafter washed with an organic solvent, the cake being maintained during these operations at a temperature so that only traces of the crystalline cake will be melted. After being sucked dry following the washing of the filter cake, the dry cake is blown with warm air to permit approximately 10 to 20 percent of the cake to melt. The resulting liquid melt is drawn through the filter cake and the cake thereafter dried by suction. The dry cake is next scraped from the drum into a vessel fitted with a coil through which is pumped the fresh feed mixture to the chiller. High purity liquid paraxylene is then transferred from the vessel to suitable storage facilities.

As will be evident to those skilled in the art various modifications can be made or followed in the light of the foregoing disclosure and discussion without departing from the spirit or scope of the invention.

We claim:

1. A process for separating a component from a liquid multi-component mixture which comprises coating the outer surface of a filtering means with a layer of crystals formed by said component by cooling said mixture; compressing said layer of crystals; subjecting the compressed layer of crystals to a first washing by a first wash liquid, the wash liquid being at such a temperature that melting of the crystals is maintained at a minimum; applying a suction to the inner surface of the washed layer of crystals so as to remove the first wash liquid; subjecting the layer of crystals to a second washing, the second wash liquid being at such a temperature that a portion of the crystals are melted; applying a suction to the inner surface of said layer of crystals so as to draw the second wash liquid and the resulting melt as reflux through said crystals and in intimate contact therewith; and recovering the washed layer of crystals as substantially pure product.

2. A process for separating a component from a liquid multi-component mixture, said component forming crystals upon the cooling of said mixture, which comprises cooling said mixture to a temperature such as to form a slurry of said crystals and mother liquor; continuously rotating the drum of a rotary filter partially submerged in said slurry of crystals and mother liquor; forming a filter cake of said crystals on a filter medium covering said drum by applying a suction on the underside of said filter medium as it rotates through said slurry; thereafter compressing said filter cake as it emerges from said slurry; applying a suction to the underside of the compressed filter cake in order to suck the crystals dry; washing the dried filter cake with a wash liquid; applying a suction to the underside of the washed filter cake so as to remove the wash liquid; melting the outer surface of said filter cake; applying a suction to the underside of said filter cake so as to draw the resulting melt as reflux through said filter cake; scraping the outer surface of said filter cake; and recovering crystals as substantially pure product.

References Cited in the file of this patent

UNITED STATES PATENTS

| | | |
|---|---|---|
| 1,836,212 | Weiland et al. | Dec. 15, 1931 |
| 2,135,605 | Stevenson | Nov. 8, 1938 |
| 2,268,788 | Wanner et al. | Jan. 6, 1942 |
| 2,592,490 | Thompson | Apr. 8, 1952 |
| 2,612,594 | Schubert et al. | Sept. 30, 1952 |
| 2,614,134 | Powers | Oct. 14, 1952 |
| 2,637,749 | Aston et al. | May 5, 1953 |
| 2,651,922 | Graham | Sept. 15, 1953 |
| 2,670,083 | McKay | Feb. 23, 1954 |
| 2,737,508 | Axe | Mar. 6, 1956 |
| 2,781,294 | McKay | Feb. 12, 1957 |

OTHER REFERENCES

Norris: "Experimental Organic Chemistry," 2nd edition (1924), pages 7 and 8 only relied on, McGraw-Hill Pub. Co., 330 W. 42nd St., N.Y., N.Y.